United States Patent [19]
Krietzman et al.

[11] Patent Number: 5,988,114
[45] Date of Patent: Nov. 23, 1999

[54] OVER-THE-DOOR CAT SCRATCHING POST

[76] Inventors: Mark Howard Krietzman; Yu-Hsin Chen, both of P.O. Box 3185, Palos Verdes Estates, Calif. 90274

[21] Appl. No.: 09/237,431

[22] Filed: Jan. 26, 1999

Related U.S. Application Data

[60] Provisional application No. 60/073,285, Jan. 31, 1998.
[51] Int. Cl.$^6$ ..................................................... A01K 15/02
[52] U.S. Cl. ............................................................ 119/706
[58] Field of Search ................................... 119/702, 706, 119/708, 709, 710, 711

[56] References Cited

U.S. PATENT DOCUMENTS

| | | | |
|---|---|---|---|
| 5,275,128 | 1/1994 | Barnes | 119/706 |
| 5,474,032 | 12/1995 | Krietzman | 119/708 |
| 5,803,786 | 9/1998 | McCormick | 119/708 |
| 5,829,390 | 11/1998 | Jonila et al. | 119/706 |
| 5,829,391 | 11/1998 | Krietzman et al. | 119/708 |

*Primary Examiner*—Thomas Price
*Attorney, Agent, or Firm*—Mark Krietzman

[57] ABSTRACT

A removable over-the-door suspending scratching device for cats which is self-dampening and provides a large volume scratching surface without requiring floor space for a base, which encourages a pet to scratch at and climb the device rather than upholstered furniture. A track suspending a raised rolling target may also be formed as part of the scratching device.

20 Claims, 3 Drawing Sheets

OVER-THE-DOOR CAT SCRATCHING POST

RELATED APPLICATIONS

The within invention claims the benefit, under Title 35, United States Code § 119 (e), of Provisional Application: 60/073285 filed Jan. 31, 1998, entitled "OVER-THE-DOOR CAT SCRATCHING POST".

TECHNICAL FIELD OF THE INVENTION

This invention relates to the art of over-the-door mounted cat scratching posts & exercise devices and more particularly to a novel group of cat clawing and exercise devices suspended from the top edge of an existing dwelling door. A suspended exerciser of this type encourages a cat away from the sofa or other fabric covered furniture and engages it to claw scratch and attack the suspended scratching post which can alleviate boredom and minimize destructive behavior.

BACKGROUND

The history of suspended cat scratching devices have generally involved solutions which mount off an existing dwelling door knob and limit the effective size and height of the scratching surface to minimize blockage of a door or doorway. The history of trackball devices presents them only in a floor resting fashion which provides for top attack.

Those well-acquainted with domestic cats will know that often the clawing of a sofa arm by a cat is performed to stretch-out and align the cats vertebra and not simply to tear apart the sofa arm. A cat will prefer a higher surface for greater stretch therefore a suspended scratching post which may be above the height of a door knob provides a more enticing surface for stretching than a sofa arm.

While large floor standing scratching posts do provide scratching surfaces of a height and size that may be as attractive to a cat as a sofa arm, such devices require a large area of dedicated floor space to host the base of the unit, and such space dedications may be impractical. Therefore, a over-the-door mounted scratching post which provides the volume and height of a large cylindrical floor standing scratching post without requiring the large area of dedicated floor space provides a desirable large scratching surface without the associated loss of floor space and without creating room obstructions.

The door knob mounted scratching surfaces taught by U.S. Pat. No. 3,085,551 issued to Helmer and U.S. Pat. No. 4,611,556 issued to Frank provide a well-anchored small light-weight and collapsible scratching surface held below the door knob or against a wall or cage. The door mounted vertical scratching surface taught by Helmer is suspended off a doorknob and all horizontal movement is eliminated by a tension bearing spring anchored to the door knob mount which pulls against a corresponding "U" shaped sleeve which is placed under the door.

The suspended toy and feline exerciser taught in applicant's U.S. Pat. No. 5,474,032 teaches a system of tethered feline target objects suspended from the top edge of a dwelling door which provides for increased erratic movement to encourage a cat to play on its own.

The movement of a target ball within a track has been demonstrated to provide a cat or incentive to play on its own. Often a trackball enclosure such a as that taught in U.S. Pat. No. 4,722,299, issued to Mohr will be pushed by the cat's play under the edge of the very sofa or chair, the toy is designed to draw the cat away from, resulting in a excited cat near furniture. A raised track with rolling ball, not found in the prior art, and anchored to a door provides the enticement of the rolling target safely suspended away from furniture.

None of the solutions provide a durable removable over-the-door mounted scratching surface which is self-dampening to limit swing when the door is opened or closed large enough to be as engaging to a cat as a sofa arm and which may be suspended off the top of an existing dwelling door and which does not impair opening or closure of the door. Nor do these solutions provide a raised trackball which a cat may attack from below.

SUMMARY OF INVENTION

Accordingly it is an object of the present invention to provide a novel removable over-the-door mounted scratching surface.

It is yet another object of the invention to provide a novel removable over-the-door mounted cylindrical scratching post.

It is yet another object of the invention to provide a novel removable over-the-door mounted system for dampening the swing of a suspended scratching surface.

It is yet another object of the invention to provide a novel removable over-the-door mounted scratching surface with a adjustable height.

It is yet another object of the invention to provide a novel removable over-the-door mounted lightweight blow-molded cylindrical base with scratching surface.

It is yet another object of the invention to provide a novel removable over-the-door mounted scratching surface which supports teases.

It is yet another object of the invention to provide a novel removable over-the-door mounted scratching with a bottom supported trackball enclosure therein.

The features of the invention believed to be novel are set forth with particularity in the appended claim. The invention itself however both as to configuration and method of operation and the advantages thereof may be best understood by reference to the following descriptions taken in conjunction with the accompanying drawings.

MODES FOR CARRYING OUT THE INVENTION

Figure 1A:
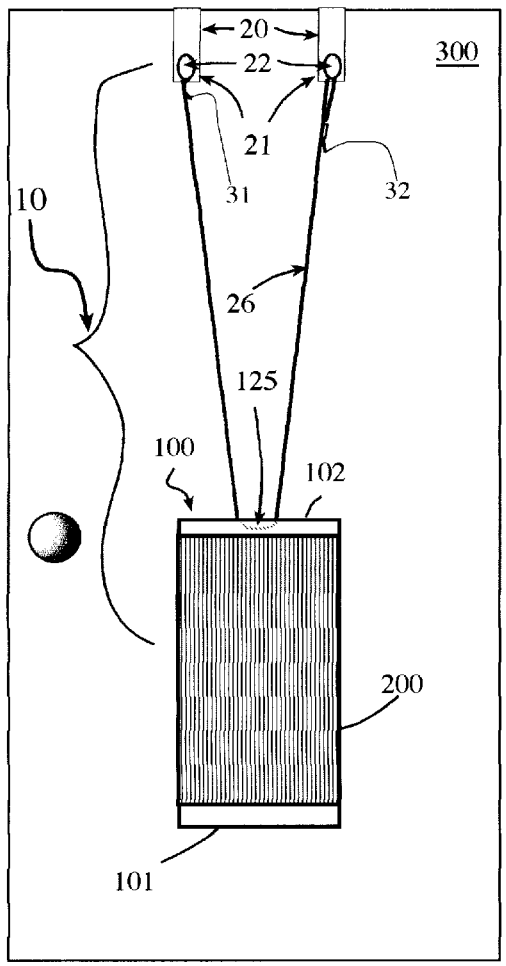
FIG. 1A illustrates a front view of the preferred embodiment of the over-the-door mounted scratching post mounted on a dwelling door.

Referring now to the drawings there is illustrated in FIG. 1A a front view of the preferred embodiment of the overthe-door mounted scratching post generally designated 10. The over-the-door mount 20 is molded to form two resilient upside down "U"s connected with a spacer bar (not shown) which maintains a selected distance between the two upside down "U"s. The over-the-door mount 20 is removably affixed over the top edge of an existing dwelling door 300.

Extending from the front planar face 21 of each of the two resilient upside down "U"s of over-the-door mount 20 is a horizontal support (not shown) and a circular tether stop 22 to which the first end 31 and the second end 32 of a flat linear tether 30 are affixed. Affixed in-between the first and second ends 31 & 32, on the tether, is a roughly cylindrical suspended scratching object 100 with a sealed bottom 101 and a partially sealed top 102.

Formed as part of, or affixed to the top 102 of, the suspended scratching object 100 is the inset tether slide guide 125 which movably connects and suspends the suspended scratching object 100 from the tether 30.

The scratching object 100 is covered with a scratching surface 200 which is constructed of a material both resilient to cat scratching and attractive to cats such as carpet, sisal rope, rope or heavy woven fabric.

Figure 1B:
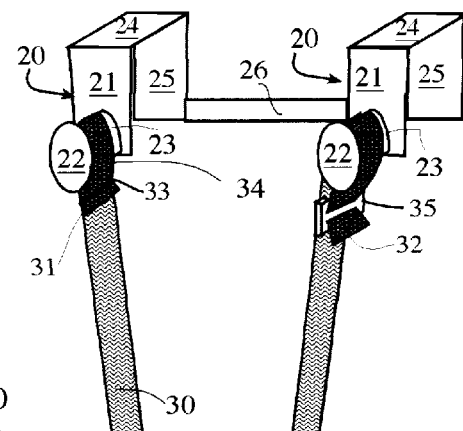
FIG. 1B illustrates a perspective view of the preferred embodiment of the over-the-door mounted scratching post.
Figure 1B:
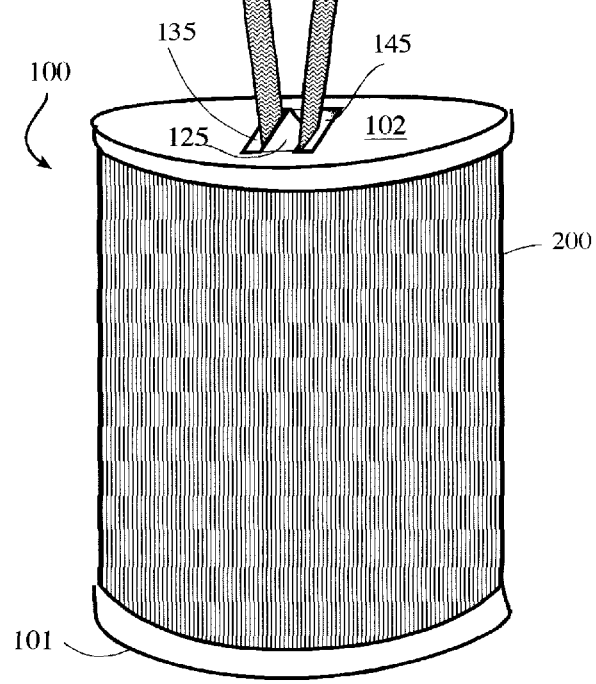

Referring now to FIG. 1B there is illustrated a perspective view of the preferred embodiment of the over-the-door mounted scratching post generally designated 10.

The two upside down "U" portions of over-the-door mount 20 are comprised each of three legs a front planar face 21 from which extends a horizontal tether support 23 and a circular tether stop 22, attached to a horizontal planar top 24 and a back planar face 25 also attached to the horizontal planar top 24. A horizontal spacing bar 26 is affixed to, and in plane with, the back planar faces 25 whereby a predetermined distance is maintained between the two "U" shaped portions of the over-the-door mount 20.

To suspend the scratching object 100 the first end 31 of the flat linear tether is folded and glued, riveted or sewn 33 onto itself forming a loop 34 of adequate size to slide over the circular tether stop 22 and is then slid over the circular tether stop 22. The second end of the tether 32 is then inserted into the tether slide guide 125 through the first dampening guide 135 around the tether slide guide 125 and out through the second dampening guide 145. The second tether end 32 is then passed over the other horizontal tether support 23 and affixed around the horizontal tether support 23 through an adjustable buckle 35. The height of the scratching object 200 may be raised or lowered by adjusting the adjustable buckle 35.

When engaged by the cat (not shown) the scratching object 200 may be freely drawn forward rotated or swung from side-to-side as the tether 30 freely moves along the tether slide guide 125. When released by the cat (not shown) the side-to-side movement of the scratching object 200 is dampening as the scratching object 200 moves along the tether slide guide 125 to the lowest point on the tether 30.

Figure 1C:
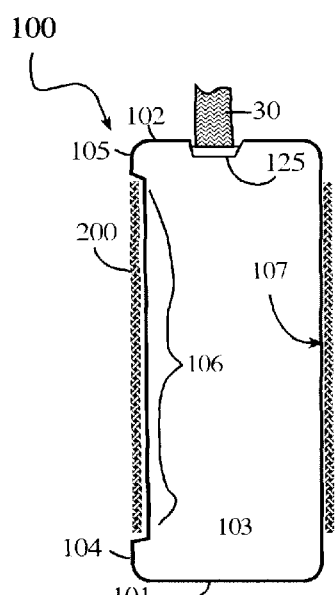
FIG. 1C illustrates a cut-away side view of the suspended scratching object of FIG. 1A.

Referring now to FIG. 1C there is illustrated a cut-away side view of the scratching object 100 of the preferred embodiment of the over-the-door mounted scratching post generally designated 10.

The scratching object 100 for light-weight and low cost is formed of a blow-molded or rotary molded shaped cylindrical base 103 with a sealed bottom 101 and a partially sealed top 102. Both the lower portion 104 and the upper portion 105 of the cylindrical base 103 is extended forward to form the scratching surface support guide 106. The scratching surface 200 may be glued around the cylindrical base 103 or glued to itself and slid over the cylindrical base 103 and held in-place within the scratching surface support guide 106.

The lower portion 104 and the upper portion 105 of the scratching surface support guide 106 are in-plane with the cylindrical base 103 on the door facing side 107 and do not extend, accordingly the scratching surface 200 forms a bumper of soft material to eliminate marring and scuffing on the door if the scratching object 200 bounces against it.

Figure 2:
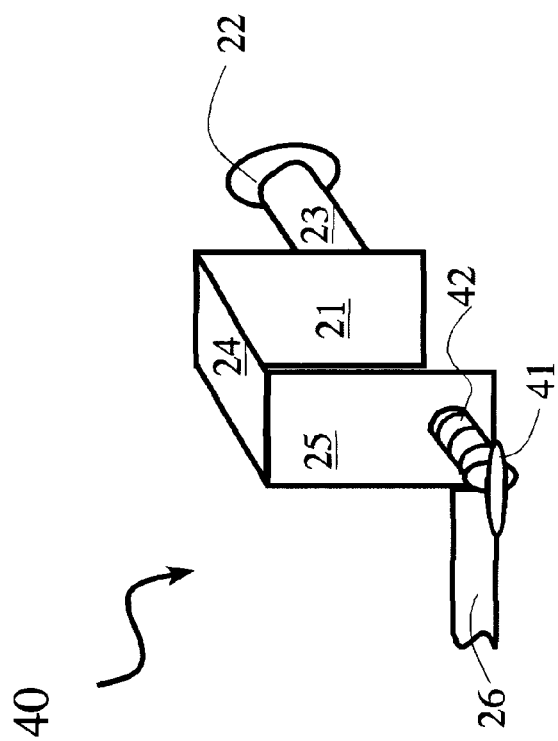
FIG. 2 illustrates a partial rear perspective view of an alternative embodiment of the mount of the over-the-door mounted scratching post.

Referring now to FIG. 2 there is illustrated a partial rear perspective view of an alternative embodiment of the mount of the over-the-door mounted scratching post generally designated 40.

For additional stability of the over-the-door mount a thumb screw 41 may be inserted through a corresponding threaded channel 42 traversing and formed as part of the back planar face 25 of one or both of the upside down "U" portions of over-the-door mount 20.

Figure 3:
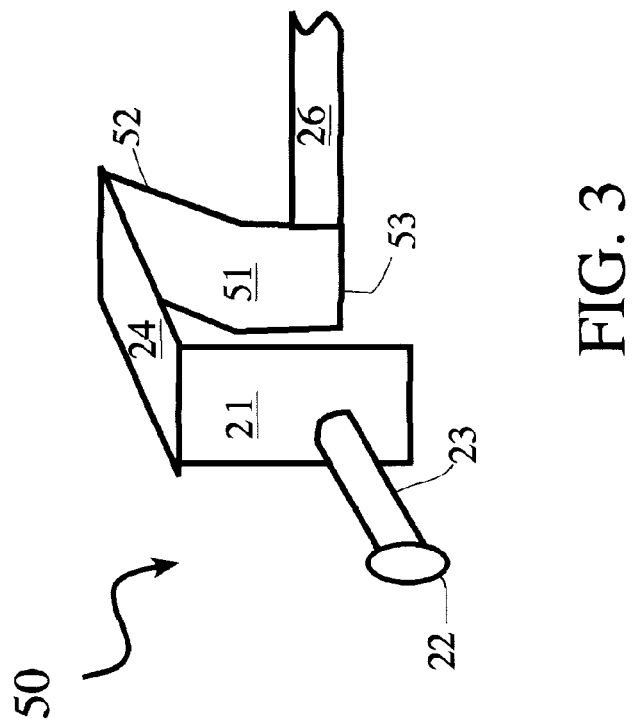
FIG. 3 illustrates a partial front perspective view of an alternative embodiment of the mount of the over-the-door mounted scratching post.

Referring now to FIG. 3 there is illustrated a partial front perspective view of an alternative embodiment of the mount of the over-the-door mounted scratching post generally designated 50.

For additional stability of the over-the-door mount the back planar face 25 of one or both of the upside down "U" portions of over-the-door mount 20 may be replaced with a skewed back face 51 whereby the attached end 52 of the skewed face attached to the horizontal planar top 24 is held a distance from the back of the front planar face 21 greater than the width of an existing dwelling door and the free end 53 is held at a distance less than the width of an existing dwelling door, whereby placing the mount 20 over the edge of an existing dwelling door causes the free end 53 to apply constant pressure against the dwelling door.

Figure 4A:
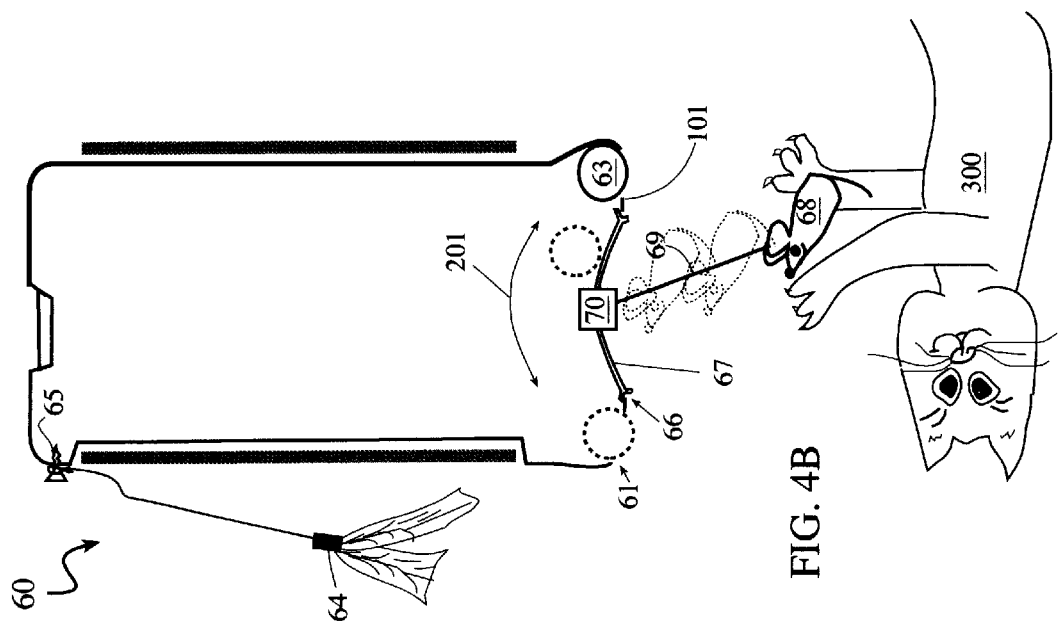
FIG. 4A illustrates a perspective view of an alternate embodiment of the over-the-door mounted scratcher with trackball and tease.

Referring now to FIG. 4A there is illustrated a perspective view of an alternate embodiment of the over-the-door mounted scratcher with trackball and tease, generally designated 60.

Formed as part of, or affixed to, the scratching object 100 to provide additional enticement for a cat to play with the device is a moving target ball 61 within a slotted track 62, suspended from the bottom 101 of the scratching object 100 via a plurality of track supports 63. The target ball 61 within the slotted track 62 is of a diameter which allows it to by batted, by a cat, from outside the scratching object 100, to roll along the slotted track 62, along the line of arrow 200, yet too large to fall out of the slotted track 62.

To further entice a cat to use the scratching object 100 is a tethered tease object 64 of a material attractive to cats and suitable for batting and clawing which may be filled or sprayed with catnip, may be affixed to the scratching object 100. A set screw 65 or other removable mounting support may be used to affix the tease 64 to the scratching object 100.

Figure 4B:
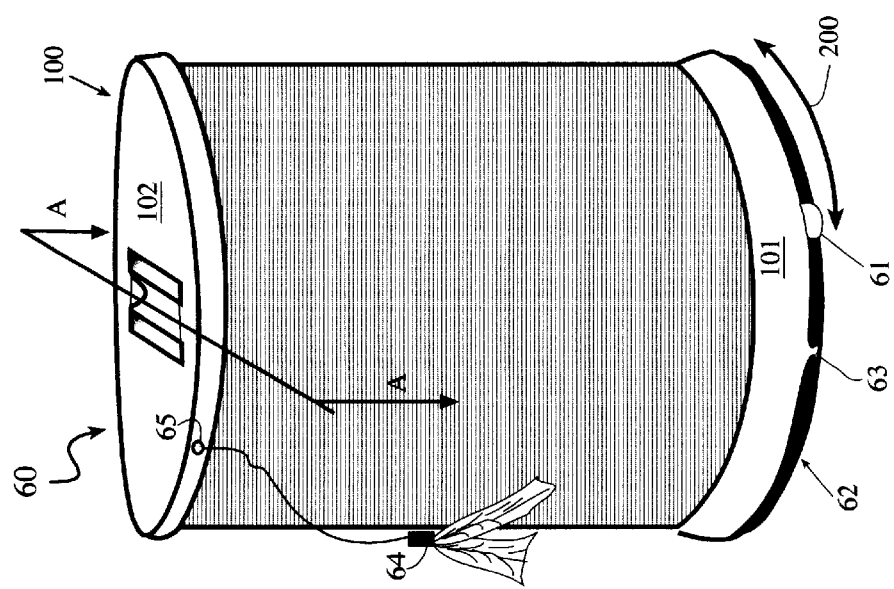
FIG. 4B illustrates a cut-away view, along line "A—A", of the embodiment of FIG. 4A.

Referring now to FIG. 4B there is illustrated a cut-away view, along line "A—A", of the embodiment of FIG. 4A, generally designated 60.

To direct the target ball 61 to the periphery of the interior of the scratching object 100 and within the slotted track 62 a bottom lid guide 66 is formed as part of, or cut into, the sealed bottom 101 of a shape similar to the slotted track 62 but slightly smaller. A raised bottom lid 67 of a size and shape which fits snugly within the bottom lid guide 66 is mounted therein. The circular ball 61, batted by a cat 300 may travel along the line of arrow 201 and is directed by the raised bottom lid 67 towards the slotted track 62 to taunt the cat 300 to continue playing.

To add further enticement for play, a second tease 68 on a tether 69 affixed to a spring motor 70 may be mounted to the raised bottom lid 67, whereby the tease 68 is dangling in close proximity to the slotted track 62 circular ball 61 and is likely to be noticed by the cat during play with the circular ball 61.

What is claimed is:

1. A removable over-the-door mounted cat scratching device, comprising:
   a) a mounting bracket which extends around the top edge of an existing dwelling door and which does not interfere with the operation of the door;
   b) a first and a second tether mount, separated by a pre-determined distance, and each affixed to said mounting bracket;
   c) a substantially non-elastic tether with a first and a second end;
   d) a mounting means to affix said tether's first end to said first tether mount;
   e) a second mounting means to affix said tether's second end to said second tether mount; and,
   f) a cat scratching object of a size and material suitable for batting and clawing by a cat suspended from said tether.

2. The arrangement according to claim 1, wherein said mounting bracket is an upside "U" shape with a front top and back planar face whereby said "U" shaped mounting bracket extends around the front top and back of an existing dwelling door.

3. The arrangement according to claim 1, wherein said cat scratching object is movably affixed to said tether through a tether slide guide whereby said scratching object may slide along said tether.

4. The arrangement according to claim 3, wherein said tether is a flat cord of a pre-determined diameter.

5. The arrangement according to claim 4, wherein:
   a) said first and said second tether mounts are each cylindrical with and enlarged free end and which each extends horizontally in the same plane from said mounting bracket;
   b) said mounting means to affix said tether's first end is a loop formed in said non-elastic tether by sewing or gluing said first end to itself of a size and shape which will slide over said enlarged free end of said first cylindrical tether mount; and,
   c) said mounting means to affix said tether's second end is a flat buckle movable affixed to said tether on one side of said second cylindrical tether mount and through which said tether's second end may be affixed after passing said second end over said second cylindrical tether mount and back through said buckle and the height said scratching object is suspended from is determined by the length of said tether which passes through said buckle upon latching.

6. The arrangement according to claim 5, wherein said scratching object further comprises:
   a) a hollow roughly cylindrical support base preferably blow-molded or rotary molded with a sealed bottom and a partially sealed top; and,
   b) a material suitable for clawing and batting by a cat affixed around said support base.

7. The arrangement according to claim 6, wherein said substantially non-elastic tether is flat and a tether slide guide is formed by two parallel guides along the top of said support base of a size and length to allow the unrestricted passage of said flat cord in through one parallel guide and out through the other parallel guide.

8. The arrangement according to claim 7, further comprising one or more teases of a material suitable for clawing and batting by a cat, removably tethered to said scratching object.

9. The arrangement according to claim 7, further comprising:
   a) one or more balls; and,
   b) a ball guide formed at the sealed bottom of said support base, of a size and shape to guide the movement of said one or more balls placed therein, around said ball guide.

10. The arrangement according to claim 1, wherein:
    a) said first and said second tether mounts are each cylindrical with and enlarged free end and which each extends horizontally in the same plane from the front of said upside down "U" shaped mounting bracket;
    b) said mounting means to affix said tether's first end is a loop formed in said non-elastic tether by sewing or gluing said first end to itself of a size and shape which will slide over said enlarged free end of said first cylindrical tether mount; and,
    c) said mounting means to affix said tether's second end is a loop formed in said second end of said non-elastic tether by sewing or gluing said second end to itself of a size and shape which will slide over said enlarged free end.

11. A removable self-dampening over-the-door mounted cat scratching device, comprising:
    a) a first and a second upside down "U" shaped door holster each of a pre-selected width and orientation to fit snugly over the top edge of an existing dwelling door and not interfere with the operation of the door with a first vertical leg which when mounted on a door is in plane with the front of the door, a second vertical leg opposite the first vertical leg and a horizontal leg affixed to the top edge of each vertical leg thereby forming the upside down "U" shape;
    b) one or more horizontal spacing bars of a pre-select length affixed to the bottom edge of said second vertical leg of said first and said second upside down "U" shaped door holsters whereby said first and said second holsters are separated by the length of said horizontal spacing bar;
    c) a flat non-elastic tether of a pre-determined diameter with a looped first end which is sewn or glued together and a second end;
    d) a cylindrical shaped tether mount formed as part of said first vertical leg of each of said upside down "U" shaped door holster and extending horizontally with an enlarged free end;
    e) a flat buckle movably affixed to said tether in-between said cylindrical shaped tether mounts through which said tether's second end may by affixed after passing said second end around said cylindrical shaped tether mount; and
    f) a cat scratching object of a size and material suitable for batting and clawing by a cat is suspended from said tether; and,
    g) a tether slide guide formed by two parallel guides along the top of said support base of a size and length to allow the unrestricted passage of said tether in through one parallel guide and out through the other parallel guide.

12. The arrangement according to claim 11, wherein said scratching object further comprises:
    a) a hollow ovoid cylindrical support base with a sealed bottom and a partially sealed top through which said parallel guides are formed and a vertical body section with a roughly flat back wall and two curved side wall which form a curved front wall section preferably blow-molded or rotary molded with; and, b) a material suitable for clawing and batting by a cat of a size and shape to surround said support base affixed around said support base.

13. The arrangement according to claim 12, wherein said support base further comprises scratching material support guide formed as part of said support base.

14. The arrangement according to claim 12, wherein said scratching material support guide further comprises:

a) a bottom edge formed around the circumference of said sealed bottom which extends beyond said vertical circular body section; and, d) a material suitable for crawling and bating by a cat of a size and shape to surround said support base affixed around said vertical circular body wall of a size and shape to nest above said bottom edge wherein said material is inhibited from being pulled off said support.

15. The arrangement according to claim 14, wherein said scratching material support guide does not extend around to said roughly flat back wall and said scratching material extends beyond said partially sealed top and sealed bottom whereby said scratching material will act as a protective bumper if said sratching object bounces against the dwelling door.

16. The arrangement according to claim 11, wherein said horizontal legs extends beyond the diameter of a dwelling door and said second vertical legs are skewed towards the dwelling door and separated from said first vertical legs by a distance less than the width of a dwelling door whereby when mounting first and a second upside down "U" shaped door holster to said door said first and said second vertical legs are pulled apart and then springedly apply pressure on the door when released and mounted.

17. The arrangement according to claim 11, further comprising:

a) a threaded thumb screw guide traversing the wall of at least one of said second vertical legs; and, b) a thumb screw which mates with said threaded thumb screw guide whereby tightening said thumb screw against said door inhibits side-to-side movement of said mount along the door.

18. The arrangement according to claim 11, further comparing one or more teases of a material suitable for clawing and batting by a cat, removably tethered to said scratching object.

19. The arrangement according to claim 11, further comparing a tease of a material suitable for clawing and batting by a cat, is movably tethered to a spring motor affixed to said scratching object, whereby said tease will retract back towards said spring motor when released during clawing play by a cat.

20. The arrangement according to claim 11, further comparing:

a) a lid guide formed in the center the sealed bottom of said support base;

b) one or more balls;

c) a lid with a raised center, of a size and shape to mate firmly with said lid guide, whereby if said one or more balls roll onto said lid the raised center directs said one or more balls towards the periphery of said sealed bottom; and, d) a series of horizontal ball guides formed between the lid guide and the corner between the side wall and base wall of said support base, of a size and shape to guide the movement of said one or more balls placed therein, around said ball guides.

* * * * *